Dec. 16, 1969     R. D. FOSTER ET AL     3,484,576
MACHINE FOR MAKING SPIRALLY WOUND COMPOSITE GASKETS
Filed Jan. 3, 1968                                     2 Sheets-Sheet 1

ROBERT DONNELL FOSTER
& JOHN C. BANKER
INVENTORS

BY
Browning, Hyco, Eickenrocht & Thompson
ATTORNEYS

Dec. 16, 1969          R. D. FOSTER ET AL          3,484,576
MACHINE FOR MAKING SPIRALLY WOUND COMPOSITE GASKETS
Filed Jan. 3, 1968                         2 Sheets-Sheet 2

ROBERT DONNELL FOSTER
& JOHN C. BANKER
INVENTORS

BY
ATTORNEYS

United States Patent Office 3,484,576
Patented Dec. 16, 1969

3,484,576
MACHINE FOR MAKING SPIRALLY WOUND COMPOSITE GASKETS
Robert Donnell Foster, Houston, and John C. Banker, Dallas, Tex., assignors, by direct and mesne assignments, to Sterling Packing and Gasket Co., Houston, Tex.
Filed Jan. 3, 1968, Ser. No. 695,412
Int. Cl. B23k 9/00, 11/00, 11/06
U.S. Cl. 219—78
6 Claims

ABSTRACT OF THE DISCLOSURE

The machine winds a metal ribbon on a rotating mandrel with a strip of packing material interleaved between the metal ribbon. A pair of spaced electrodes are mounted for rotation around an axis parallel to the axis of rotation of the mandrel. When two or more layers of the metal strip are wrapped on the mandrel, the electrodes are moved into engagement with the strip. Electrical current is passed between the electrodes through the metal strip intermittently to weld the layers together at spaced intervals as the electrodes rotate with the metal ribbon. After the contiguous layers of metal ribbon are welded together, the electrodes move away from the ribbon and the metal ribbon and a strip of packing material are wound on the mandrel with the packing being wound between layers of the metal ribbon. When the end of the packing strip is reached, two or three wraps of the metal ribbon alone are made and the electrodes move back into rolling engagement with the ribbon and weld together these outer contiguous layers of metal ribbon in the same manner that they welded the inner layers to complete the gasket.

---

This invention relates to machines for making composite gaskets and, in particular, to machines for making such gaskets which are spirally wound ribbons of metal and strips of packing material.

Spirally wound composite gaskets comprise a metal ribbon, usually formed with a longitudinally extending bead or corrugation, which is spirally wound around a mandrel with a strip of packing material interleaved between the successive convolutions of the metal ribbon. Gaskets of this type are extensively used in all types of high pressure fluid systems. The material from which the packing strip is made will depend on the service in which the gasket is to be placed. Both asbestos and Teflon are commonly used packing materials.

These gaskets are manufactured by winding the metal ribbon and packing strip together on a rotating mandrel. The diameter of the mandrel determines the size of the central opening through the gasket. Before the winding of the packing strip begins, two or three contiguous layers of the metal ribbon are wound on the mandrel and spot welded together. The alternate layers of metal ribbon and packing strip are then wound on the mandrel. After the packing strip has been wound on the mandrel two or three more wraps of metal ribbon alone are made. These contiguous convolutions of metal ribbon are spot welded together to finish the gasket. The innermost and outermost contiguous layers of metal ribbon are welded together to keep the gasket from unwinding, when it is removed from the mandrel.

Heretofore, when the inner and outer contiguous layers of metal ribbon were to be welded together, the mandrel was stopped and two electrodes were moved into engagement with the ribbon to spot weld the contiguous layers of metal ribbon together. The mandrel was then rotated through a given angle and the electrodes moved back into engagement with the ribbon to weld the contiguous layers together at another spot. Three or four such spot welds were made around the periphery of the contiguous layers with the mandrel stopping for each weld. Having to stop and start the mandrel throughout the welding operations was time consuming and reduced the output of a given gasket machine.

Therefore, it is an object of this invention to provide a machine for manufacturing spiral wound composite gaskets of the type described above in which the mandrel continues to rotate during the welding operations.

It is another object of this invention to provide a machine for making spiral gaskets having welding electrodes that rotate with the gasket on the mandrel when in engagement therewith and weld the inner and outer contiguous layers of metal ribbon, while the gasket and mandrel continue to rotate.

These and other objects, advantages, and features of this invention will be apparent to those skilled in the art from a consideration of this specification, including the attached drawings and appended claims.

The preferred embodiment of the invention will now be described in connection with the attached drawings in which.

Figure 3:
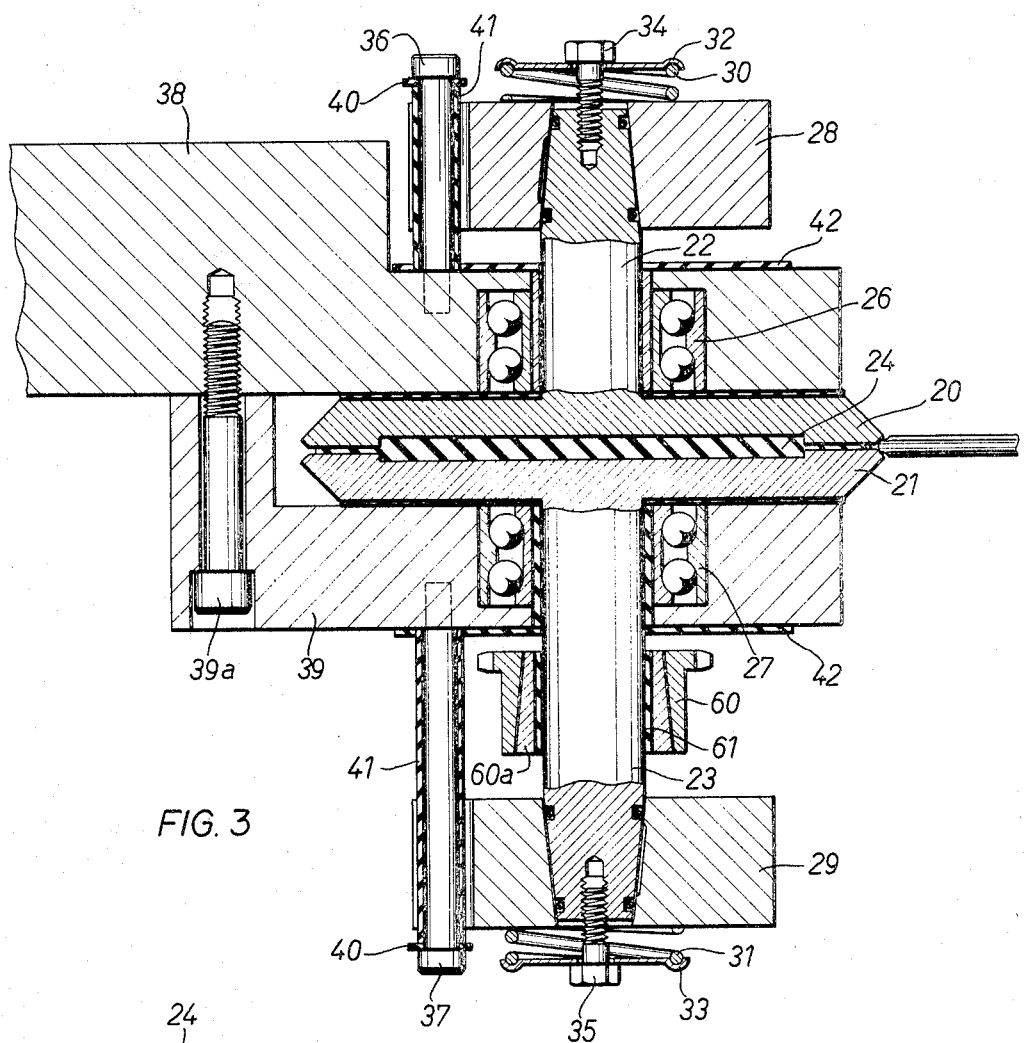
Figure 4:
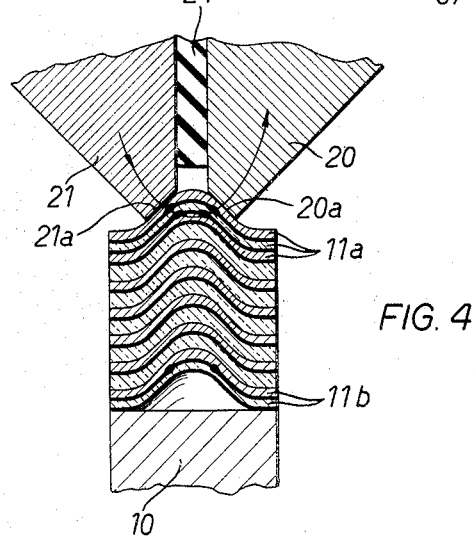

FIGURE 3 is a cross sectional view on an enlarged scale of the welding electrodes of the gasket winding machine showing the electrodes in position to weld the contiguous layers of metal ribbon of the gasket; and FIGURE 4 is a sectional view, on an enlarged scale, of the ends of the electrodes in contact with the outside peripheral surface of the gasket to weld the outer layers of metal ribbon together to finish the gasket.

To simplify the drawings and the explanation of the invention only the parts of the machine that are pertinent to the invention and to its explanation are shown in the drawings.

Figures 1, 2:
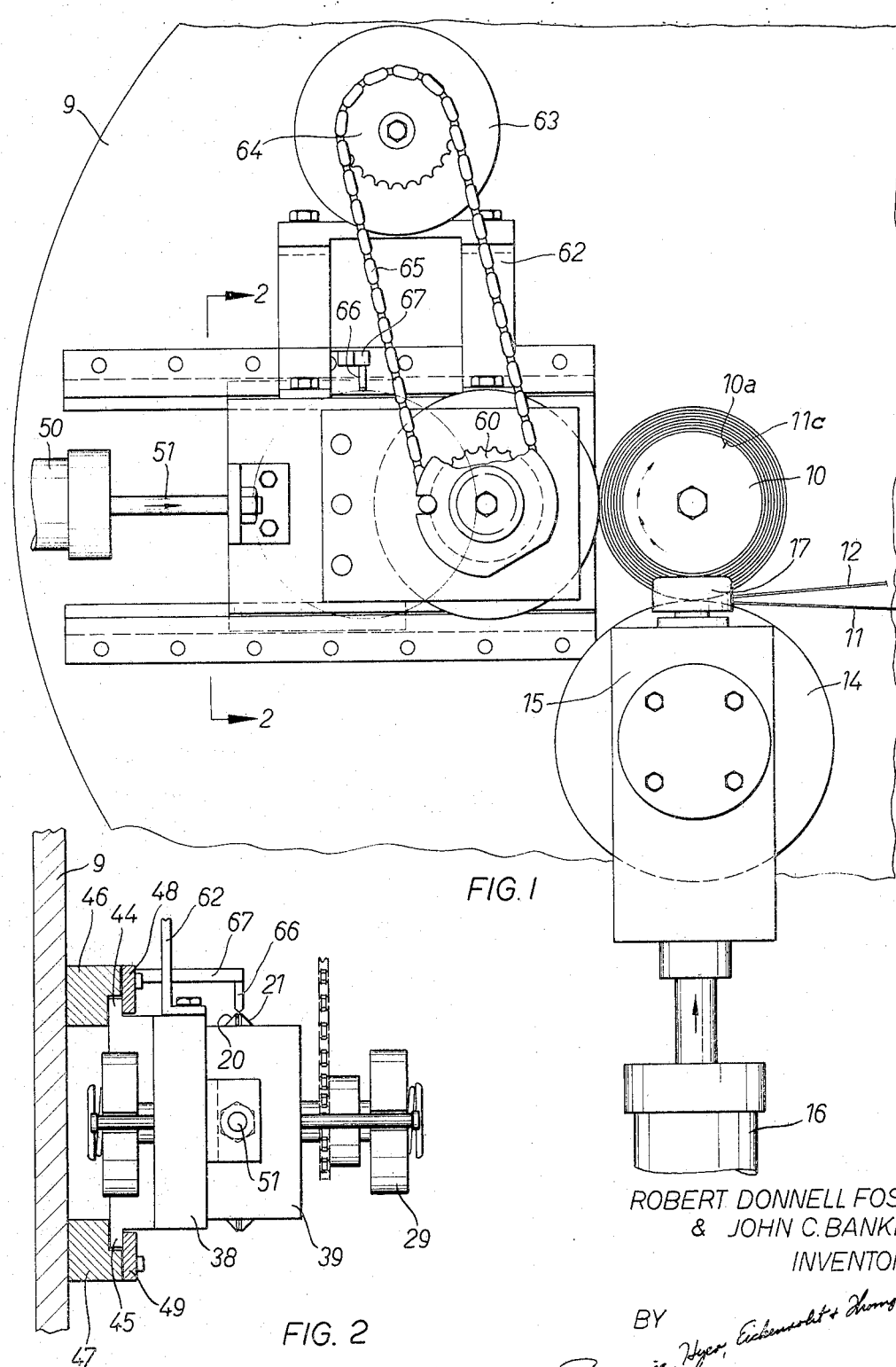
FIGURE 1 is a front view of the spiral gasket winding machine of this invention.
FIGURE 2 is a cross sectional view taken along the line 2—2 of FIGURE 1.

In FIGURE 1, mandrel 10 is mounted for rotation around its central axis by means that are now shown, but which are conventional and include a driven shaft upon which the mandrel is mounted and which supports the mandrel away from face plate 9. The mandrel comprises a metal disc, which is as thick as the gasket to be wound on it. The outer periphery of the mandrel is cylindrical, as shown in FIGURE 4, so the gasket wound thereon can be removed.

To wind a gasket, end 11c of the metal ribbon is inserted in radial slot 10a in mandrel 10 and bent over until it is tangent to the mandrel. This anchors the end of the metal ribbon to the mandrel and causes the mandrel to wrap the metal ribbon around it, as it is rotated in the direction shown in FIGURE 1. After two or more wraps of metal ribbon 11 are formed on the mandrel, packing strip 12 is inserted between the coils of the mandrel and the metal strip to cause the packing to be wound around mandrel 10 in between successive layers of metal ribbon 11.

Usually, the packing strip is cut to a predetermined length depending upon the width of the gasket to be made and is fed to the mandrel and winding machine from a trough located adjacent the mandrel. Metal ribbon 11 is fed from a reel of the ribbon and is usually formed into the cross-sectional shape shown in FIGURE 4 by rollers located between the reel and the mandrel. The material from which packing strip 12 is made usually will conform to the shape of the metal ribbon without any difficulty. To assist in this, roller 14 is mounted for rotation between U-shaped bracket 15. The outer periphery of roller 14 engages the metal ribbon as it starts to spiral around the mandrel 10 and exerts a radial force on it to force the packing strip 12 to conform to the configuration of the strip. Pneumatic cylinder 16 resiliently holds roller 14 against the gasket with a constant pressure and allows the roller to move radially away from the mandrel, as the gasket increases in diameter. Side rollers 17, only one of which is seen in FIGURE 1, help keep the metal ribbon and packing strip in radial alignment with the mandrel and planish the metal ribbon and packing strip.

As explained above, the usual practice is to spot weld the inner and outer contiguous layers of metal ribbon to keep the gasket from unwinding after it is removed from the mandrel. In accordance with this invention, means are provided for welding these contiguous inner and outer layers of metal ribbon, while the mandrel continues to rotate, whereas heretofore it had been necessary to stop the mandrel for each spot welding operation.

In the embodiment shown, the welding means includes disc-shaped electrodes 20 and 21 having arcuate outer surfaces. Means are provided to mount the electrodes for rotation in spaced apart, side-by-side, parallel relationship around axes parallel to the axis of rotation of the mandrel. As shown in FIGURE 3, electrodes 20 and 21 are so mounted for rotation around a common axis parallel to the axis of rotation of the mandrel by shafts 22 and 23. Electrodes 20 and 21 are integrally connected to shafts 22 and 23 and they are located close together since they must engage laterally spaced circumferential areas on the contiguous layers of metal ribbon which usually is not very wide. For example, two popular commercial gaskets have thicknesses of 0.125 and 0.175 inch. Being located so close together, there is a tendency for the welding current to arc across the air gap. Therefore, the space between the two electrodes is nearly completely filled with insulation. Any desired insulation can be used for this purpose. In the embodiment shown, a disc of micarta is used. Disc 24 is machined to the shape shown and attached to the two electrodes with epoxy cement. This not only insulates the two electrodes from each other, but also connects them together so that the two electrodes and shafts 22 and 23 form an integral structure. Bearings 26 and 27 support shafts 22 and 23 and electrodes 20 and 21 for rotation around the longitudinal axis of the shafts. The bearings, in turn, are supported by base support 38 and L-shaped front support 39. The latter is attached to the base support by mounting screws 39a.

The electrodes and their supporting shafts are made out of electrically conductive material, such as brass or copper. Welding current is supplied to one of the electrodes and conducted from the other electrode through stationary contact rings or brushes 28 and 29, which are mounted on the tapered ends of shafts 22 and 23, respectively. Each brush has a tapered opening through it which engages the taper on the end of the shafts. Coil springs 30 and 31 hold the brushes in position on the tapers to make good electrical contact with the shafts. The springs are compressed against brushes 28 and 29 by spring retainers 32 and 33 and cap screws 34 and 35. The brushes are held against rotation with the shaft by shoulder screws 36 and 37, which extend through openings in the brushes and engage tapped holes in base support 38 and front support 39. The shoulder screws are insulated electrically from brushes 28 and 29 by insulating washers 40, insulating sleeves 41, and face insulators 42. Electrical cables (not shown) are connected to brushes 28 and 29 and to the output of a welding machine (not shown).

Means are provided for moving the electrodes into and out of rolling engagement with the metal ribbon, as it is wound on mandrel 10. In the embodiment shown, base support 38 of the electrode assembly has oppositely extending flanges 44 and 45 as shown in FIGURE 2. These flanges extend into oppositely facing elongated grooves formed by spaced apart, parallel, supporting members 46 and 47 and retaining plates 48 and 49. Elongated mounting members are attached to face plate 9 and extend outwardly therefrom far enough to locate electrodes 20 and 21 in position to move into and out of engagement with laterally spaced circumferential areas on the peripheral edge of the gasket being wound on mandrel 10. Pneumatic cylinder 50 has one end (not shown) attached to the face plate and its rod 51 attached to base support 38 to slide flanges 44 and 45 in the grooves formed by the mounting members and retaining plates and move the electrodes in and out of engagement with the gasket.

FIGURE 4 is an enlarged cross-sectional view of a gasket having the outer contiguous layers 11a of metal ribbon 11 welded. Electrodes 20 and 21 are held in engagement with the gasket by cylinder 50. The electrodes rotate with the gasket and the mandrel. The arcuate peripheral surfaces of the electrodes are shaped to engage laterally spaced circumferential areas on the peripheral surface of the metal ribbon. Since the metal ribbon is corrugated in cross-section, the electrodes have beveled edge surfaces 20a and 21a to roll along the sloping sides of the corrugation.

The direction of flow of current is shown by the arrow to be from electrode 21 through contiguous layers 11a of metal ribbon into electrode 20, which serves as the ground electrode in this arrangement. The current supplied is sufficient to cause the contiguous layers of metal ribbon to weld themselves together. The welding current is supplied intermittently as the electrodes and mandrel continue to rotate so that, preferably, one to three welds will be made in the outside layers during one revolution of the mandrel. In other words, it is preferred not to continuously weld the contiguous layers completely around the peripheral edge of the gasket. Two or three spot welds have been found to be sufficient to hold the gasket from unwinding and it also reduces the embrittling effect on the metal ribbon of the welding operation. The inside contiguous layers 11b were welded in the same manner, after which the electrodes were moved out of engagement with the gasket.

Insulation 24 does not come quite to the end of the gap between the electrodes. During the welding operation, there will usually be some spatter that collects on surfaces 20a and 21a and between the electrodes. If allowed to build up, this spatter could bridge between the electrodes and reduce, if not completely eliminate, the ability of the electrodes to weld the outer metal layers together. Therefore, according to this invention, means are provided to clean the arcuate welding surfaces of the electrodes between welding operations. In the embodiment shown, sprocket 60 is mounted on shaft 23 through split insulating sleeve 61 which electrically insulates sprocket 60 from the current flowing through the shaft. The sprocket drives the shaft through the frictional forces created between the sprocket and the insulating sleeve by split wedge shaped mounting ring 60a.

Mounted on front support 39 through bracket 62 is electric motor 63. This electric motor drives shaft 23 through sprocket 60 on the shaft, sprocket 64 on the output shaft of the motor, and roller chain 65. In operation, preferably, motor 63 runs continuously to keep the electrodes rotating at all times. This serves two purposes. First, when the electrodes are moved rapidly into engagement with the rotating gasket being formed on mandrel 10, they will be rotating in the desired direction already and they will not need to be accelerated as much to get up to the speed of the gasket. Secondly, when the electrodes are moved to the dotted line position shown in FIGURE 1 between welding operations, cleaning tool 66 which is mounted on bracket 67, as shown in FIGURE 2, will move between electrodes 21 and 22 and remove any weld spatter, which may have collected between the electrodes during the last welding operation.

Since the gasket and mandrel are rotating faster than motor 63 will rotate the electrodes, in overrunning clutch of any desired type may be used in the drive between the motor and shaft 23. In one commercial embodiment of the invention, a Formsprag overrunning clutch-FS Series-Model No. 5 was used.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A machine for winding a gasket composed of a spiral wound metal ribbon and an interleaved spiral wound packing strip with the inner and outer layers of the metal ribbon being wound upon themselves and welded together to hold the spirally wound ribbon from unwinding, comprising, a mandrel upon which the metal ribbon and packing strip are wound, means for rotating the mandrel to wind the ribbon and strip spirally around the mandrel, means for feeding the ribbon and strip to the mandrel to wind at least two layers of the metal ribbon on the mandrel before the winding of the packing strip is started and to wind at least two layers of the metal ribbon after the packing strip has been wound on the mandrel to provide contiguous inner and outer layers of metal ribbon, and means for welding the contiguous inner and outer layers of metal ribbon while continuing to rotate the mandrel, said welding means including two electrodes having arcuate outer surfaces, means mounting the electrodes for rotation in spaced apart side-by-side parallel relationship around axes parallel to the axis of rotation of the mandrel, means for moving the arcuate outer surfaces of the electrodes into rolling engagement with laterally spaced circumferential areas on the outer periphery of the metal ribbon when the inner layers of the metal ribbon are wound on the gasket and when the outer layers of metal ribbon are wound upon themselves, and means for passing sufficient electrical current from one electrode to the other through the layers of metal ribbon to weld the contiguous layers together as the mandrel continues to rotate.

2. The machine of claim 1 in which the current passing means operates intermittently to weld the metal ribbon at spaced intervals.

3. The machine of claim 1 further provided with means for moving the electrodes into engagement with the gasket to weld the inner and outer contiguous layers of ribbon and for moving the electrodes out of engagement after said layers have been welded.

4. The machine of claim 3 further provided with means for rotating the electrodes at a speed below that of the mandrel to reduce the acceleration imparted to the electrodes when they are moved into engagement with the gasket, said rotating means including overrunning clutch means for permitting the electrodes to be accelerated to the speed of the gasket when the electrodes are in engagement therewith.

5. The machine of claim 3 further provided with means for cleaning the electrodes of weld spatter when the electrodes are moved out of engagement with the gasket.

6. The machine of claim 5 in which the cleaning means includes a scraping tool mounted to scrape between the electrodes and along their arcuate edges while they are rotated by said rotating means.

References Cited

UNITED STATES PATENTS

| 1,806,738 | 5/1931 | Burns et al. |
| 2,892,919 | 6/1959 | McLean. |
| 2,479,556 | 8/1949 | Chanowitz. |
| 3,359,402 | 12/1967 | Rieppel. |
| 3,341,681 | 9/1967 | Elchisak et al. |

JOSEPH V. TRUHE, Primary Examiner

B. A. STEIN, Assistant Examiner

U.S. Cl. X.R.

219—81; 29—163.5; 228—15